United States Patent [19]

Van der Lugt

[11] 4,205,587
[45] Jun. 3, 1980

[54] SELF-LOCKING ANCHORING BOLT

[76] Inventor: Gerrit W. Van der Lugt, Rijnstract 236 - I, Amsterdam, Netherlands

[21] Appl. No.: 895,118

[22] Filed: Apr. 10, 1978

[30] Foreign Application Priority Data

Apr. 27, 1977 [NL] Netherlands ............................ 7704583

[51] Int. Cl.² ................................................ F16B 13/04
[52] U.S. Cl. ........................................... 85/64; 85/79; 405/259
[58] Field of Search ............................ 85/63, 64, 79; 151/25 R; 61/45 B; 405/259

[56] References Cited

U.S. PATENT DOCUMENTS

| 666,334 | 1/1901 | Stewart | 151/25 R |
| 1,193,436 | 8/1916 | Shoop | 85/79 X |
| 1,495,913 | 5/1924 | Lobuono | 85/63 X |
| 1,798,002 | 3/1931 | Silbaugh | 85/63 |
| 1,854,737 | 4/1932 | Haug | 85/79 X |
| 3,427,919 | 2/1969 | Lerich | 85/79 X |

FOREIGN PATENT DOCUMENTS 215874  7/1958  Australia ........................................ 85/79

*Primary Examiner*—Thomas J. Holko
*Attorney, Agent, or Firm*—Morse, Altman, Oates & Bello

[57] ABSTRACT

A self-locking anchoring bolt provided with a shank portion to be fitted in a bolt hole, provided with an elongated locking element disposed in a correspondingly formed location which extends substantially helically in the bolt shank.

5 Claims, 10 Drawing Figures

SELF-LOCKING ANCHORING BOLT

SUMMARY OF THE INVENTION

The invention relates to a self-locking anchoring bolt comprising a shank portion and a thread portion.

It is known that for securing an anchoring bolt one uses an expansion box that co-acts with a conical portion on the shank of the bolt for urging parts of the expansion box outward, so that such a box is locked in the bolt hole and the anchoring bolt itself is retained against radial and axial displacements. Also use is made of one or more loose segments which are urged outward e.g. by a conically turned portion on the bolt shank. With an anchoring bolt thus secured the cylindrical surface of the bolt shank itself has no direct contact with the wall of the bolt hole, while the length of the contact face between the segments or box portions and the shank is very small relative to the length of the bolt shank. Consequently, in anchoring bolts thus designed, transverse forces on the thread portion extending beyond the bolt hole will result in the anchoring bolt in the bolt hole tilting over some distance, while the relatively slight surface area of the co-acting faces of the segments or boxes and the bolt shank and the contact faces between the locking elements and the bolt hole are too small, especially with longer and varying loads, to ensure an effective attachment.

It is the object of the invention to provide an improved anchoring bolt of the type described above.

For this purpose it is proposed to provide an anchoring bolt of the above mentioned type with at least one oblong locking element which is disposed in a correspondingly formed elongated recess in the bolt shank, which recess mainly extends helically in the jacket surface of the shank. Such a locking element is preferably provided with two opposite longitudinal ribs, of which one rib has a swivel bearing contact with a corresponding edge in the longitudinal recess in the bolt shank, while the opposite rib in resting position is nearly flush with the surface of the bolt shank. The locking element may be provided with a portion extending nearly parallel to the jacket surface of the bolt shank and projecting relative to the locking element, of which a guide face co-acts with a corresponding run-on face provided in the bolt shank, in such a way that upon relative movements between bolt shank and locking element, such as these occur when the anchoring bolt is pulled out of the bolt hole, or upon rotation thereof, the locking element will execute a tilting movement around the tilting edge. Thereby, in cross section at right angles to the longitudinal axis of the locking element, the section of the recess, at least towards one side, will have clearance relative to the locking element for allowing the tilting movement of the locking element. Preferably, at the end facing away from the guide face of the projecting portion of the locking element, a square abutting face is provided so that during insertion of the bolt shank with locking element in a bolt hole, the locking element remains in its swivelled-in position. In order to ensure a rapid initial locking, an edge of the projecting portion spaced apart from the longitudinal axis of the locking element is preferably provided with a set-up point portion which in resting position of the locking element slightly projects relative to the bolt shank surface.

Further features of the invention will become apparent from the following description of an embodiment.

DESCRIPTION OF THE PREFERRED EMBODIMENTS

Figure 1:
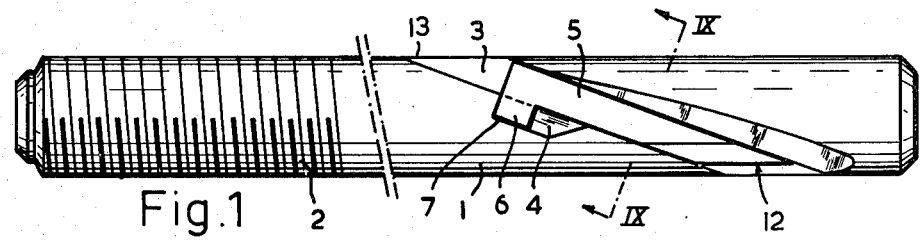
FIG. 1 shows a view of an anchoring bolt according to the invention, provided with a locking element.
Figure 2:
FIG. 2 is an end view of the bolt shown in FIG. 1.
Figure 3:
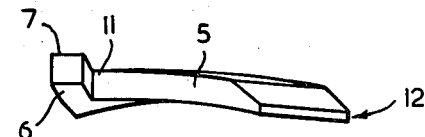
FIG. 3 is a view of a locking element of the bolt shown in FIG. 1.
Figure 5:
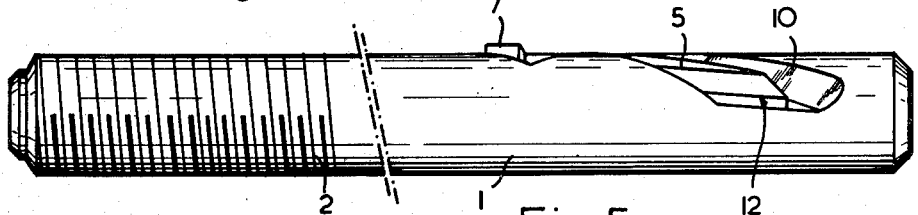
FIG. 5 shows the bolt shown in FIG. 1 swivelled, however, through 90° about its longitudinal axis.
Figure 9:
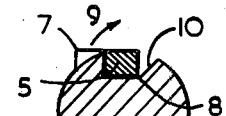
FIG. 9 is a cross section on the line IX—IX in FIG. 1.
Figure 8:
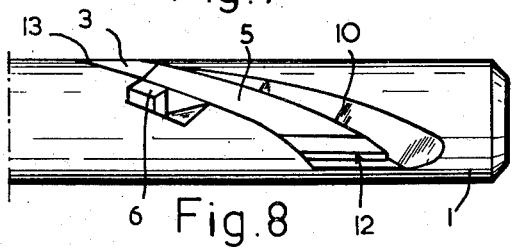
FIG. 8 is a corresponding view of the shank portion of the bolt in a position lying between that shown in FIG. 1 and FIG. 5, the locking element being present.

As shown in FIG. 1 an anchoring bolt according to the invention is provided with a shank portion 1 and a thread portion 2. Shank portion 1 is intended for being mounted in a bolt hole or bore in a construction element, e.g. a brick or concrete wall, a wooden, steel or other member. There will be hardly any resistance during the insertion of the bolt shank, except for some friction. During the tightening of a nut, the anchoring bolt may not, however, rotate along, while the anchoring bolt should be capable to take up substantial tensile forces as well. For this purpose the bolt shank accommodates a mainly helically extending recess 3. Slightly aside the oblong recess 3 there is a lateral recess with run-on face 4. Inside the recess there is an oblong locking element 5 having a head portion 6. At the top of the head portion there is a projecting point or edge portion 7. In the resting or insertion position the surface of the locking element 5 is nearly flush with the surface of the bolt shank 1, except for the edge portion 7.. After the bolt has been entirely fitted, a rotation of the bolt, e.g. under influence of the screwing of a nut on the thread portion 2, as well as an axial displacement in outward direction, will have the result that the edge portion 7 urges the locking element 5 to swivel, as best shown by FIG. 9. Then the locking element 5 will start tilting around the lower rib 8 in the direction of arrow 9. To make said swivelling motion possible the wall 10 of the recess 3 has a receding design relative to the corresponding face on the locking element 5. The head 6 at the locking element 5 extends with part of its leading edge or guide face 11 upwards along a part or an edge of the run-on face 4 upon an axial displacement between locking element and bolt shank, as a result of which the said swivelling motion around the rib 8 will likewise be effected. Although FIG. 3 depicts the locking element 5 as bent helically, it will be clear that other shapes that are merely substantially helical are contemplated. Also, it is contemplated that in various modifications, the slot is positioned other than as shown herein, one alternative being that the slot extends to the end of the bolt.

Figure 4:
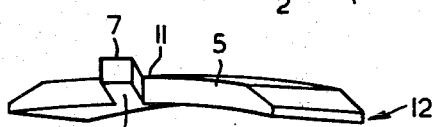
FIG. 4 shows a variant invention of the locking element.
Figure 6:
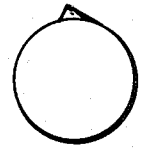
FIG. 6 is an end view of the bolt in the position shown in FIG. 5.
Figure 7:
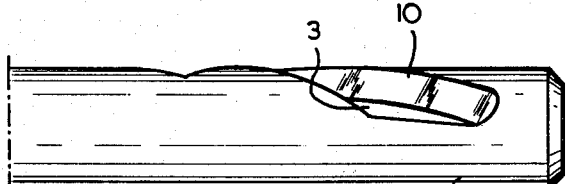
FIG. 7 is a side view of the shank portion of the bolt shown in FIG. 5 but after the locking element has been removed.
Figure 10:
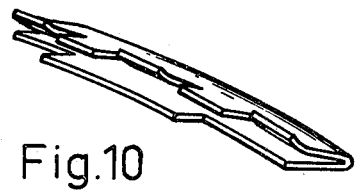
FIG. 10 shows a further variant of a locking element.

The anchoring bolt according to the envention offers the advantage that the bolt shank remains in contact with the material of the bolt hole along the entire length of the shank with a major part of the circumference opposite the recess 3, so that tilting movements at loads at right angles to the longitudinal axis of the bolt shank are avoided. Also the locking element itself along a substantial length is in contact with both the material of the bolt hole and with the bolt. The sharp edge at the locking element results in a reliable and effective locking, which is maintained even at varying loads and during longer periods of time. An effective fitting is achieved both in hard and soft material. In FIG. 1, 13 indicates the run-out end of the recess 3. This point offers an easy possibility of checking the adequate depth of the insertion of the bolt shank in the bolt hole. Since the insertion end of the bolt shank is normally cylindrical and corresponds with the bolt hole, the anchoring bolt will be accurately guided during the insertion in the bolt hole. The locking element may be fixed in the shank recess by simple means, e.g. glue or adhesive tape. FIG. 4 shows a variant embodiment of the locking element, in which the projection portion fitted approximately halfway, along the locking element. This ensures a more effective locking when the locking element is not very torsion-stiff, e.g. made of synthetic material. FIG. 10 shows a further variant of the locking element, in which the locking element is made from bent spring steel.

I claim:

1. A self-locking anchoring bolt comprising:
   (a) a forward threaded portion and a rearward shank portion along an axis;
   (b) said shank portion having a slot of generally helical and generally oblong shape convoluted about said axis and having a lateral recess communicating with said slot;
   (c) said recess having a bearing face that extends at an angle outwardly and rearwardly with respect to said axis;
   (d) a locking element having a body portion of generally helical and generally oblong shape and having a laterally extending projection portion;
   (e) said body portion and said projection portion of said locking element being seated respectively in said slot and said recess of said shank portion;
   (f) said body portion being constrained by said slot for movement between a forward axial position and a rearward axial position;
   (g) said projection portion being constrained in said recess by said bearing face between an inner radial position when said body portion is in said forward axial position and an outer radial position when said body portion is in said rearward axial position;
   (h) said body portion being constrained in said slot for swivelling movement as said body portion moves between said forward axial position and said rearward axial position and said projection portion moves between said inner radial position and said outer radial position.

2. The self-locking anchoring bolt of claim 1 wherein a single sharp edge of said locking element is exposed beyond the periphery of said shank portion when said projection portion is in said outer radial position.

3. The self-locking anchoring bolt of claim 1 wherein the outer edge of said projection portion is nearly flush with the periphery of said shank portion when said projection portion is in said inner radial position.

4. The self-locking anchoring bolt of claim 1 wherein said projection portion is located medially along said body portion.

5. The self-locking anchoring bolt of claim 1 wherein said projection portion is located substantially at an end of said body portion.

* * * * *